United States Patent
Yamada et al.

(10) Patent No.: US 10,440,193 B2
(45) Date of Patent: Oct. 8, 2019

(54) IMAGE READING DEVICE AND IMAGE FORMING APPARATUS

(71) Applicant: CANON KABUSHIKI KAISHA, Tokyo (JP)

(72) Inventors: Kaname Yamada, Matsudo (JP); Shinji Kawamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/728,298

(22) Filed: Oct. 9, 2017

(65) Prior Publication Data
US 2018/0103156 A1    Apr. 12, 2018

(30) Foreign Application Priority Data
Oct. 11, 2016    (JP) .................. 2016-200404

(51) Int. Cl.
*H04N 1/04* (2006.01)
*H04N 1/00* (2006.01)
*G03G 15/00* (2006.01)

(52) U.S. Cl.
CPC ....... *H04N 1/00013* (2013.01); *G03G 15/602* (2013.01); *H04N 1/0066* (2013.01); *H04N 1/00602* (2013.01); *H04N 1/00795* (2013.01); *H04N 1/00615* (2013.01); *H04N 2201/0081* (2013.01)

(58) Field of Classification Search
CPC ........... H04N 1/00013; H04N 1/00602; H04N 1/0066; H04N 1/00795; H04N 1/00615; H04N 1/00798; H04N 1/00206; H04N 1/00554; H04N 1/121; G03G 15/602

USPC .............. 358/474, 497, 496, 498, 468, 1.15; 399/379, 380
See application file for complete search history.

(56) References Cited

U.S. PATENT DOCUMENTS

| | | | |
|---|---|---|---|
| 5,644,663 | A | 7/1997 | Saito |
| 5,726,770 | A | 3/1998 | Harada |
| 5,831,751 | A | 11/1998 | Ohneda |
| 6,252,684 | B1 | 6/2001 | Lin |
| 6,788,830 | B1 | 9/2004 | Morikawa |

(Continued)

FOREIGN PATENT DOCUMENTS

| | | |
|---|---|---|
| CN | 1423467 A | 6/2003 |
| CN | 1918579 A | 2/2007 |

(Continued)

*Primary Examiner* — Cheukfan Lee
(74) *Attorney, Agent, or Firm* — Canon U.S.A., Inc. IP Division

(57) ABSTRACT

An image reading device includes a reading unit to read a sheet image and a turning unit to turn relative to the reading unit. The turning unit includes a conveyance roller to convey a sheet to a reading position, a discharged sheet stacking tray having the read sheet, a discharge roller to discharge the sheet to the discharged sheet stacking tray, and a communication unit to wirelessly receive data from outside the image reading device. Where the sheet is stacked, the discharged sheet stacking tray includes a first region and a second region downstream of the first region. The first region has a sheet regulating portion at a front side of the first region located higher than a bottom face where the sheet is stacked, and the second region does not have the sheet regulating portion. A reading part to read communication unit information is disposed overlapping the second region.

18 Claims, 11 Drawing Sheets

(56) References Cited

U.S. PATENT DOCUMENTS

| | | |
|---|---|---|
| 7,003,176 B1 | 2/2006 | Suzuki |
| 8,514,463 B2 | 8/2013 | Fujiwara |
| 8,548,520 B2 | 10/2013 | Connors |
| 9,089,064 B2 | 7/2015 | Katsuyama |
| 10,082,994 B1 | 9/2018 | Ruiz |
| 2002/0106217 A1 | 8/2002 | Ando |
| 2003/0037114 A1 | 2/2003 | Nishio |
| 2003/0062471 A1 | 4/2003 | Hayashi |
| 2003/0063331 A1 | 4/2003 | Hayashi |
| 2003/0075605 A1* | 4/2003 | Chien ............... H04N 1/00127 235/454 |
| 2004/0004644 A1 | 1/2004 | Komatsu |
| 2005/0104148 A1 | 5/2005 | Yamamoto |
| 2006/0071386 A1 | 4/2006 | Mizubata |
| 2006/0104653 A1 | 5/2006 | Yamamoto |
| 2006/0139700 A1 | 6/2006 | Murakami |
| 2006/0193013 A1 | 8/2006 | Hoshi |
| 2006/0203306 A1 | 9/2006 | Hoshi |
| 2007/0064252 A1 | 3/2007 | Iwago |
| 2007/0065197 A1 | 3/2007 | Tanaka |
| 2007/0170254 A1* | 7/2007 | Ishihara ............... G06K 7/0021 235/439 |
| 2008/0061990 A1 | 3/2008 | Milnes |
| 2008/0316541 A1 | 12/2008 | Takata |
| 2009/0316222 A1 | 12/2009 | Oshida |
| 2010/0039659 A1 | 2/2010 | Suzuki |
| 2010/0061782 A1* | 3/2010 | Harada ............... G03G 15/605 399/380 |
| 2010/0221032 A1* | 9/2010 | Ishio ............... G03G 15/6552 399/82 |
| 2010/0321729 A1* | 12/2010 | Yagi ............... H04N 1/0057 358/1.15 |
| 2011/0075226 A1 | 3/2011 | Fujiwara |
| 2011/0292356 A1 | 12/2011 | Tsukinoki |
| 2012/0027465 A1 | 2/2012 | Yamamoto |
| 2012/0099134 A1 | 4/2012 | Harigae |
| 2012/0114381 A1 | 5/2012 | Okoshi |
| 2012/0218172 A1 | 8/2012 | Border |
| 2013/0194599 A1 | 8/2013 | Tomoda |
| 2013/0235429 A1 | 9/2013 | Kitagawa |
| 2014/0029041 A1 | 1/2014 | Okubo |
| 2014/0118439 A1 | 5/2014 | Kambe |
| 2014/0118764 A1* | 5/2014 | Maghakian ............... B41J 3/44 358/1.13 |
| 2014/0132652 A1* | 5/2014 | Nakamura ............... G03G 15/5075 347/1 |
| 2014/0169823 A1* | 6/2014 | Ishida ............... G03G 21/1628 399/90 |
| 2014/0233162 A1 | 8/2014 | Katsuyama |
| 2014/0306402 A1 | 10/2014 | Onishi |
| 2014/0327926 A1 | 11/2014 | Katsuyama |
| 2015/0043955 A1 | 2/2015 | Nishizawa |
| 2015/0281511 A1 | 10/2015 | Furutani |
| 2016/0057296 A1* | 2/2016 | Tamura ............... G03G 15/5091 358/1.13 |
| 2016/0094740 A1* | 3/2016 | Sunohara ............... H04N 1/00541 358/1.14 |
| 2016/0142575 A1 | 5/2016 | Yokoyama |
| 2016/0186762 A1 | 6/2016 | Rautenstrauch |
| 2016/0191746 A1 | 6/2016 | Yokoyama |
| 2016/0269581 A1 | 9/2016 | Matsunami |
| 2016/0301824 A1 | 10/2016 | Shibao |
| 2016/0360046 A1 | 12/2016 | Katayama |
| 2016/0360057 A1 | 12/2016 | Ogasawara |
| 2017/0223217 A1 | 8/2017 | Hama |
| 2017/0336746 A1 | 11/2017 | Mizuguchi |
| 2017/0359470 A1 | 12/2017 | Takahashi |
| 2018/0101344 A1 | 4/2018 | Hishinuma |
| 2018/0103156 A1 | 4/2018 | Yamada |
| 2018/0103165 A1 | 4/2018 | Yamamoto |
| 2018/0103166 A1 | 4/2018 | Katayama |
| 2018/0103167 A1 | 4/2018 | Ogasawara |
| 2018/0103173 A1 | 4/2018 | Ogasawara |
| 2018/0307450 A1 | 10/2018 | Pandi |

FOREIGN PATENT DOCUMENTS

| | | |
|---|---|---|
| CN | 101212534 A | 7/2008 |
| CN | 103106360 A | 5/2013 |
| CN | 105190447 A | 12/2015 |
| JP | S64-50069 A | 2/1989 |
| JP | 2003241443 A | 8/2003 |
| JP | 2006025331 A | 1/2006 |
| JP | 2006080863 A | 3/2006 |
| JP | 2009192861 A | 8/2009 |
| JP | 2010250038 A | 11/2010 |
| JP | 2012210801 A | 11/2012 |
| JP | 2013030042 A | 2/2013 |
| JP | 2015115798 A | 6/2015 |

* cited by examiner

IMAGE READING DEVICE AND IMAGE FORMING APPARATUS

BACKGROUND OF THE INVENTION

Field of the Invention

The present disclosure relates to an image reading device that reads images on sheets, and to an image forming apparatus having the same.

Description of the Related Art

There are known image forming apparatuses and the like using electrophotography that ask for personal authentication by IC card to improve security. An authentication device that performs the personal authentication is disposed at a position adjacent to an operation panel provided to the image forming apparatus main unit (U.S. Pat. No. 9,089,064), provided on a side face of the image forming apparatus main unit (Japanese Patent Laid-Open No. 2013-30042), and so forth.

SUMMARY OF THE INVENTION

An image reading device according to an aspect of the present invention includes a reading unit having a reader configured to read an image on a sheet, and a turning unit configured to turn respect to the reading unit, wherein the turning unit includes a conveyance roller configured to convey a sheet to a position where an image is read by the reader, a discharged sheet stacking tray on which is stacked the sheet of which the image has been read by the reader, a discharge roller configured to discharge the sheet to the discharged sheet stacking tray, and a communication unit configured to receive data from outside the image reading device, wherein a region of the discharged sheet stacking tray where the sheet is stacked includes a first region and a second region that is further downstream in a sheet conveyance direction than the first region, wherein the first region is a region having a sheet regulating portion at a front side of the first region that is higher than a bottom face where the sheet is stacked, and the second region is a region not having the sheet regulating portion, and wherein a reading part configured to read information by the communication unit is disposed at a position overlapping the second region.

Further features of the present invention will become apparent from the following description of embodiments with reference to the attached drawings.

BRIEF DESCRIPTION OF THE DRAWINGS

FIG. 1A is a frontal view and FIG. 1B is a perspective view.

FIG. 2A is a frontal view and FIG. 2B is a perspective view.

FIG. 3A is a perspective view illustrating a document feeder that is in an open state as to a reader unit, and FIG. 3B is an enlarged view of a hinge.

FIG. 6A is a perspective view of a state where a document pressing plate is removed therefrom, and FIG. 6B is an explanatory diagram in a case of attaching a card reader thereto.

FIG. 7A is a perspective view of a state where the document pressing plate is removed therefrom, and FIG. 7B is a perspective view of a state where the document pressing plate is attached thereto.

FIG. 8A is a view from one direction, and FIG. 8B is a view from a different direction.

DESCRIPTION OF THE EMBODIMENTS

An embodiment will be described in detail with reference to the drawings. An image reading device can make up a standalone configuration such as a flat-bed scanner, and can also be used as an image reading unit in an image forming apparatus such as a photocopier or facsimile device or the like. The image reading device also may have an automatic document feeder (hereinafter referred to as "document feeder"), and be of a configuration where documents are read while being conveyed. Note that the dimensions, materials, shapes, relative layouts, and so forth of components described in the following embodiment do not restrict the present invention in any way, unless specifically stated.

Overview of Configuration

Figure 1A:
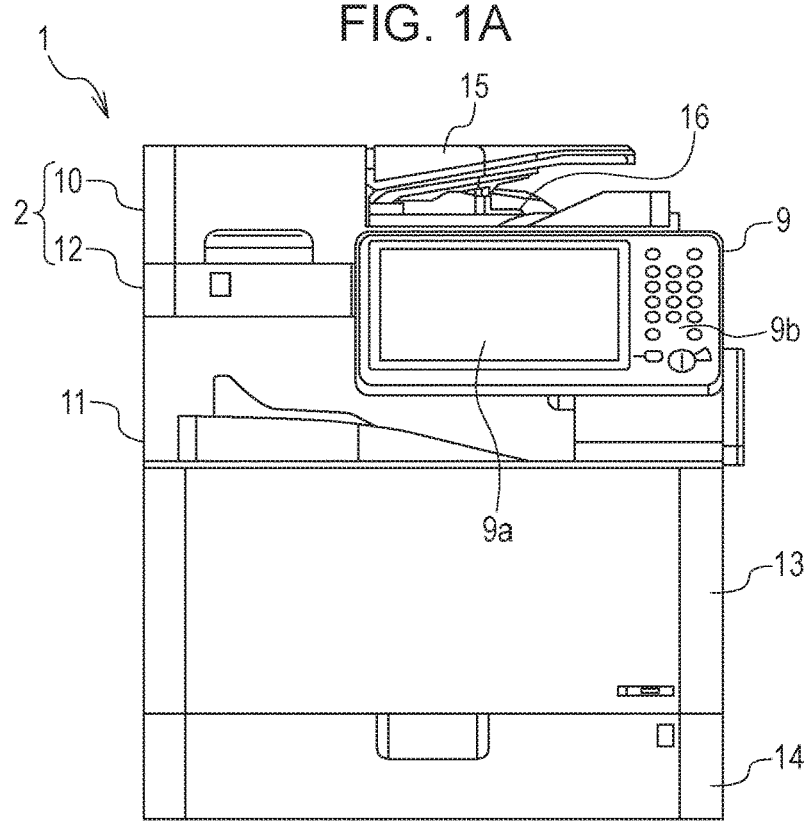
FIGS. 1A and 1B are diagrams illustrating an image forming apparatus according to a first embodiment, where
Figure 1B:
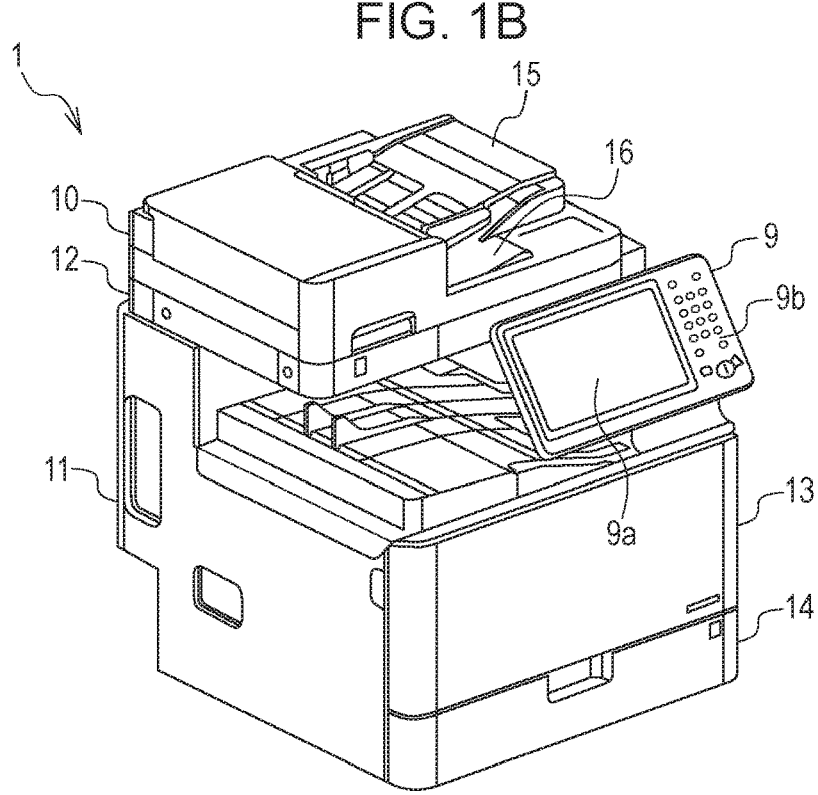

FIG. 1A is a frontal diagram of an image forming apparatus 1. FIG. 1B is a perspective view of the image forming apparatus 1.

The image forming apparatus 1 includes an image reading device 2 and an image forming apparatus main unit 11. The image reading device 2 includes a document feeder 10 that is a turning unit, a reader unit 12 that is a reading unit, a document stacking tray 15, and a document discharge tray 16 that is a discharged sheet stacking tray. The image forming apparatus main unit 11 includes an image forming unit 13, a sheet feeding unit 14, and an operating panel 9. The operating panel 9 has an image display unit 9a and a keypad 9b. The image forming unit 13 is provided within the image forming apparatus main unit 11, and forms images by a known electrophotography system. The image forming unit 13 has a photosensitive member, an exposing device, a developing device, a transfer device, and a fixing device. The exposing device forms an electrostatic latent image on the photosensitive member based on image information. The developing device develops the electrostatic latent image into a toner image using toner. The transfer device transfers the toner image onto a sheet of recording medium conveyed from the sheet feeding unit 14. The fixing device fixes the toner image on the recording medium onto the recording medium. In a case of copying, the image information is generated by reading an image on a document (sheet) by the image reading device 2, which is transmitted to the image forming unit 13. In a case of printing, the image information is transmitted from an external device such as a personal computer (PC) or the like to the image forming unit 13 as a print job.

Figure 2A:
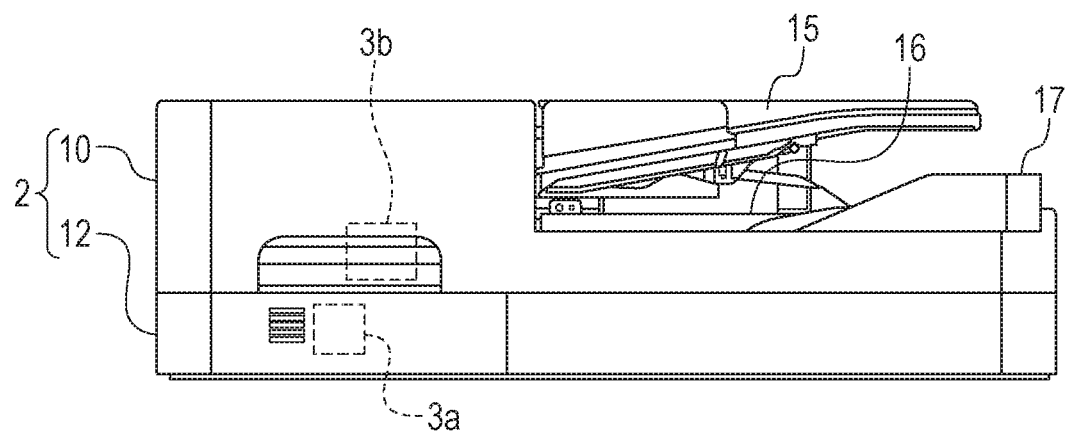
FIGS. 2A and 2B are diagrams illustrating an image forming device according to the first embodiment, where
Figure 2B:
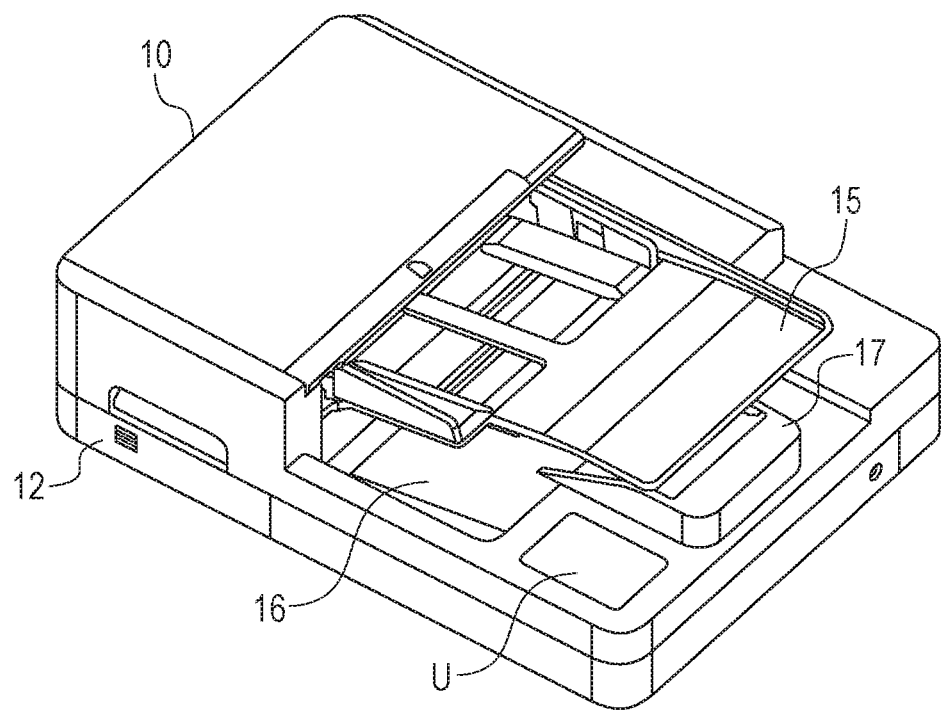

FIG. 2A is an enlarged frontal view of the image reading device 2 in FIG. 1A. FIG. 2B is an enlarged perspective view of the image reading device 2 in FIG. 1B.

The document stacking tray 15 and document discharge tray 16 of the image reading device 2 are configured to overlap at least partly in the vertical direction. An authentication unit U is provided on the front side of the document feeder 10. A card reader 18, that is a communication unit that acquires authentication information of a user is provided within the authentication unit U. The card reader 18 serves to communicate with the user by wireless communication, and more specifically is a non-contact IC card reader. The user causes the card reader 18 to read the authentication information of the card, by holding the authentication card up to the authentication unit U.

Description will be made regarding a case of performing document flow reading using the image reading device 2. The user loads a document on the document stacking tray 15, and instructs the reading of the document at the operating panel 9. The document is fed by a sheet feed roller that is omitted from illustration, and an image on the surface of the document is read by a reading unit 3a. Note that in a case of reading both faces of the document, an image on the rear face of the document is also read, by a reading unit 3b. A compact image sensor (CIS) or complementary metal-oxide semiconductor (CMOS) sensor may be applied for the reading unit 3a. The document discharge tray 16 is provided with an inclined portion 17. The inclined portion 17 is arranged to protrude more than adjacent portions. A document discharged to the document discharge tray 16 rests with just the middle portion thereof in the lateral direction (the direction orthogonal to the conveyance direction of the document) thereof being raised by the inclined portion 17. Accordingly, a gap between the document discharge tray 16 and the document is created at the edge portions of the document in the lateral direction, enabling the user to insert his/her hand into this gap, thereby facilitating easy removal of the document by the user.

Figure 3A:
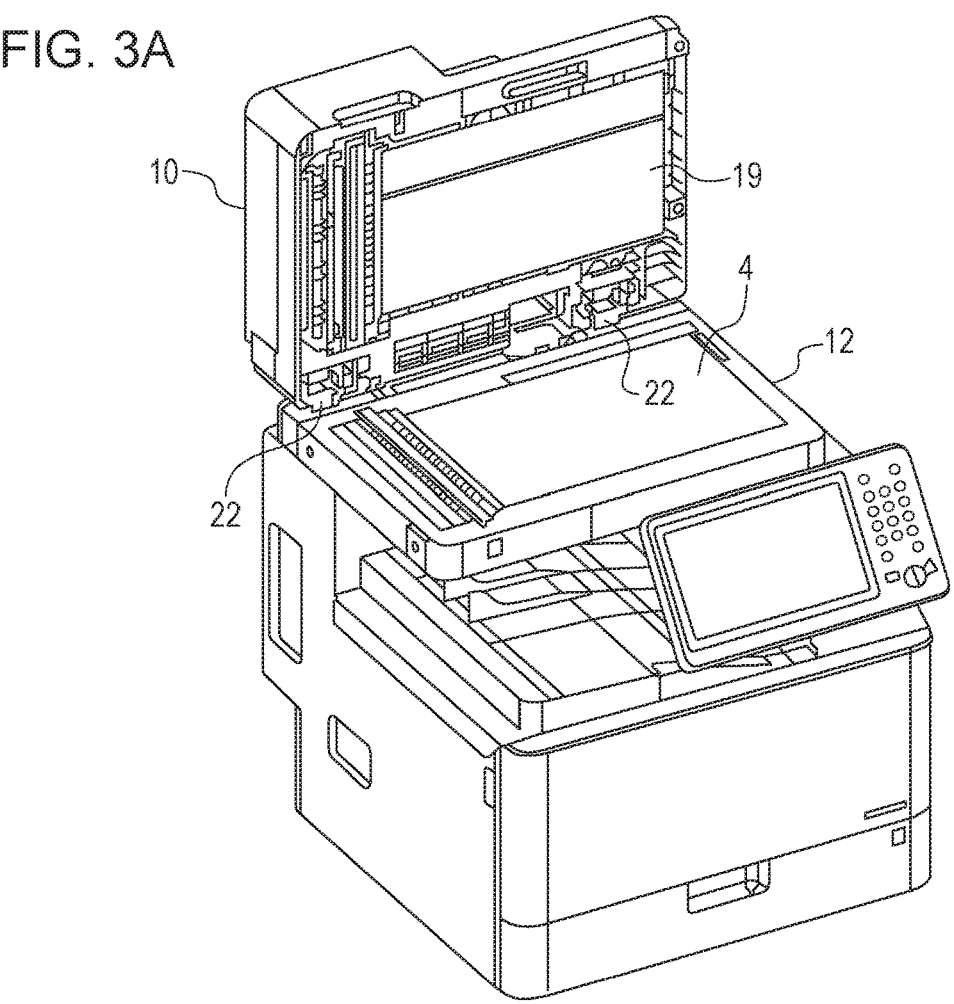
FIGS. 3A and 3B are diagrams regarding the first embodiment, where
Figure 3B:
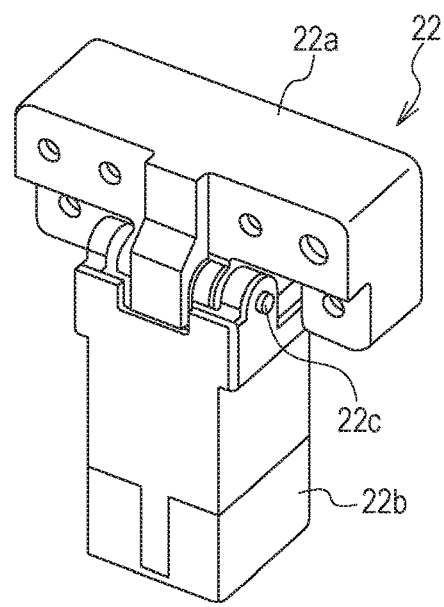

FIG. 3A is a perspective view illustrating a state where the document feeder 10 is opened as to the reader unit 12. The document feeder 10 is provided capable of turning as to the reader unit 12 on a hinge 22. The document feeder 10 assumes an open position where a reading glass 4 is open, and a closed position where the reading glass 4 is blocked, due to the document feeder 10 turning. The document feeder 10 has a document pressing plate 19. The document pressing plate 19 is configured to press the document upon the reading glass 4 when the document feeder 10 is in the closed position. The reader unit 12 has the reading glass 4. FIG. 3B is an enlarged view of the hinge 22.

FIG. 3B is an enlarged diagram of the hinge 22. A coupling portion 22a serves to couple the document feeder 10 and hinge 22 to each other. A coupling portion 22b serves to couple the reader unit 12 and the hinge 22 to each other. The hinge 22 has a rotation shaft 22c, and is structured such that the document feeder 10 can turn as to the reader unit 12 on the rotation shaft 22c.

A case of loading a document on the reading glass 4 and performing reading will be described. The user opens the document feeder 10 to expose the reading glass 4. The user loads the document on the reading glass 4 with the image facing downwards, and closes the document feeder 10. The document pressing plate 19 of the document feeder 10 presses the document against the reading glass 4. When the user instructs reading of the document from the operating panel 9, the reading unit 3a moves and reads the image on the document.

Figure 4:
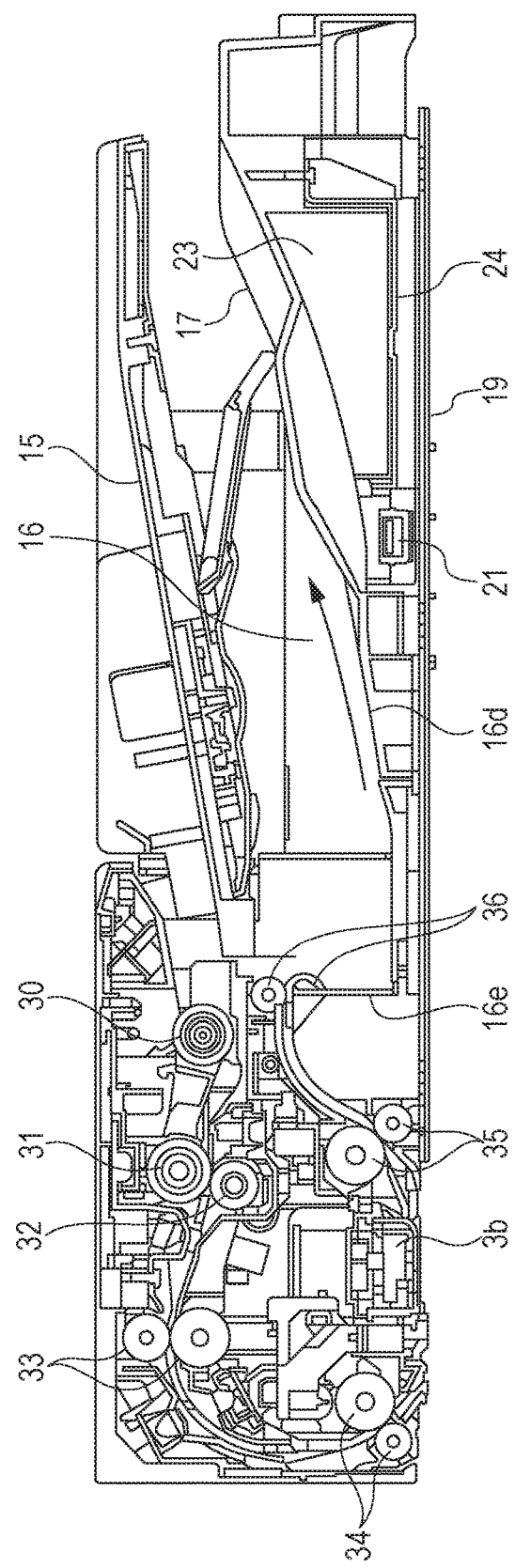
FIG. 4 is a cross-sectional view of the document feeder.

FIG. 4 is a cross-sectional view of the document feeder 10. A pickup roller 30 comes into contact with the uppermost sheet stacked on the document stacking tray 15, and feeds this document toward a sheet feed roller 31. The sheet feed roller 31 is provided downstream from the sheet feed roller 31 in the sheet conveyance direction, and conveys documents conveyed from the pickup roller 30 downstream. A separating roller 32 is in contact with the sheet feed roller 31, and in a case where multiple documents have been conveyed thereto, functions to separate the documents into individual sheets. The separating roller 32 is rotationally driven via a torque limiter that is omitted from illustration, in a direction of returning documents back toward the document stacking tray 15. In a case where two sheets are nipped between the sheet feed roller 31 and the separating roller 32, the document in contact with the separating roller 32 is returned in the direction of the document stacking tray 15 by the rotation of the separating roller 32. On the other hand, in a case where only one sheet is nipped between the sheet feed roller 31 and the separating roller 32, the separating roller 32 rotates following the rotation of the sheet feed roller 31. The torque value of the aforementioned torque limiter is set so that the driving transmission satisfies such a relationship.

The documents separated into individual sheets by the sheet feed roller 31 and the separating roller 32 are conveyed to a position where the images on the documents are read by the reading unit 3a, by conveying roller pairs 33 and 34. After images on the surface of the documents are read by the reading unit 3a, the documents are conveyed by a conveying roller pair 35, and discharged onto the document discharge tray 16 by a discharge roller pair 36.

Figure 5:
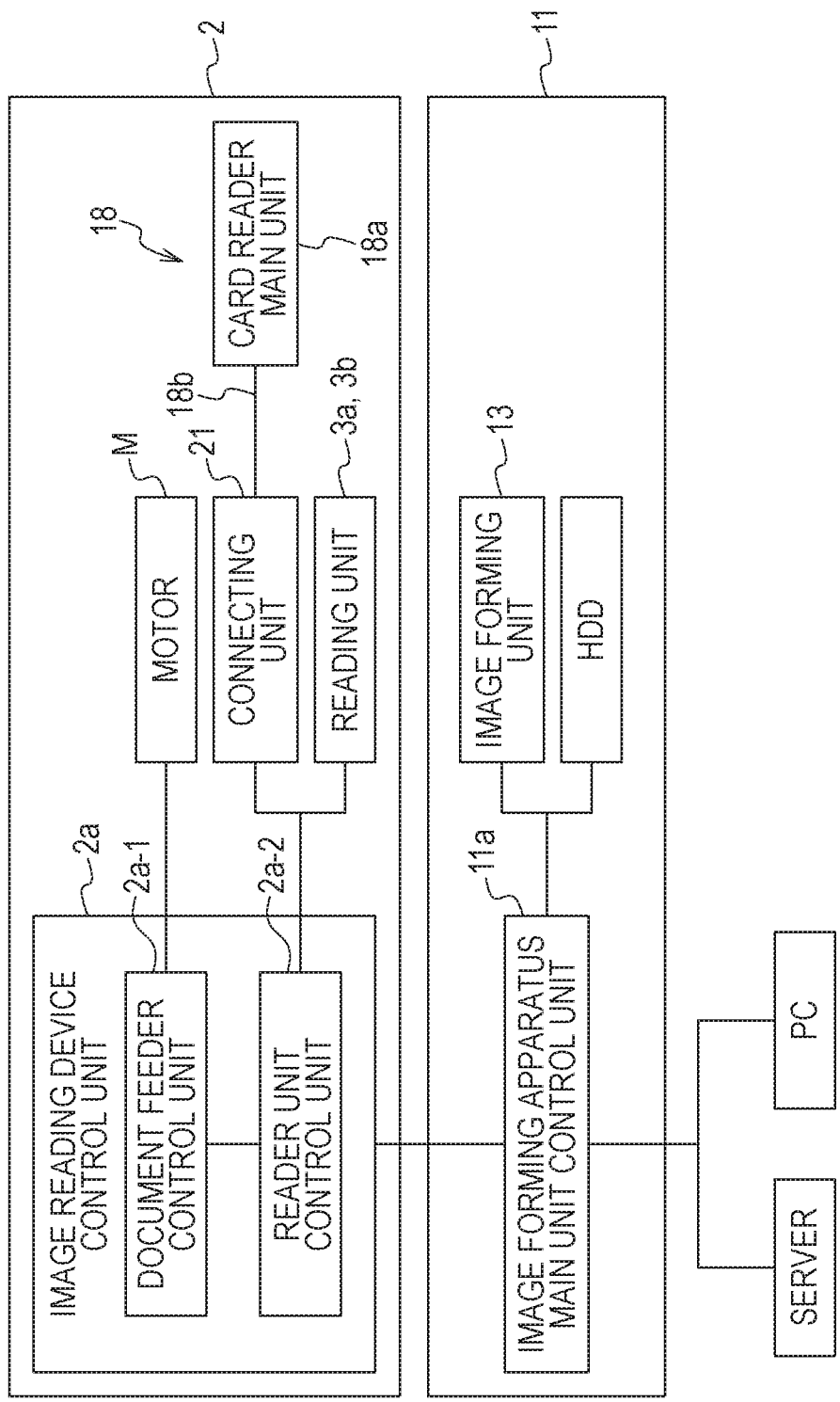
FIG. 5 is a control block diagram of the image forming apparatus.

FIG. 5 is a control block diagram of the image forming apparatus 1. The image reading device 2 has an image reading device control unit 2a. The image forming apparatus main unit 11 has an image forming apparatus main unit control unit 11a is a control circuit board having a central processing unit (CPU), read-only memory (ROM), and random access memory (RAM). The image reading device control unit 2a and image forming apparatus main unit control unit 11a are capable of communication with each other. The image forming apparatus main unit control unit 11a is capable of communication with a server, PC, or the like, outside of the image forming apparatus 1.

The image forming apparatus main unit control unit 11a is electrically connected to the image forming unit 13 and a hard disk drive (HDD). The image forming apparatus main unit control unit 11a controls the image forming unit 13.

The image reading device control unit 2a has a document feeder control unit 2a-1 and a reader control unit 2a-2. The document feeder control unit 2a-1 and reader control unit 2a-2 each are a control circuit board having a CPU, ROM, and RAM. The document feeder control unit 2a-1 is electrically connected to a motor M. The reader control unit 2a-2 is electrically connected to reading units 3a and 3b, and a Universal Serial Bus (USB) connecting unit 21 (hereinafter, "connecting unit 21"). The document feeder control unit 2a-1 controls the motor M. The motor M provides driving force to the pickup roller 30, sheet feed roller 31, conveying roller pairs 33 through 35, and the discharge roller pair 36. Note that driving of the pickup roller 30 and so forth may be carried out by a single motor, or by multiple motors. The reader control unit 2a-2 controls the reading units 3a and 3b. The document feeder control unit 2a-1 and reader control unit 2a-2 are electrically connected by a communication cable. This communication cable is guided by a later-described cable guide 50.

Connecting a USB cable 18b that is a communication cable for communicating with a card reader main unit 18a (communication device main unit) to the connecting unit 21 enables communication between the card reader 18 and the image reading device control unit 2a. Authentication information of the user that has been read by the card reader 18 is matched with the user information stored in the HDD of the image forming apparatus main unit 11, and the image forming apparatus 1 authenticates the user. Note that the user information may be stored in a server connected to the image forming apparatus 1 by a network.

Attachment Configuration of Card Reader 18 and Attachment Method

A method of attaching the card reader 18 to the inside of the document discharge tray 16 of a document feeder main unit 10a, and the structure of an attaching portion, will be described with reference to FIGS. 6A through 8B. Depending on the location of installation and usage of the image forming apparatus 1, the authentication device such as the card reader 18 or the like does not necessarily have to be provided to the image forming apparatus 1. For example, in a case where the location of installation of the image forming apparatus 1 is in a public facility and authenticating users is difficult, or in a case where only a few trusted people will be using the image forming apparatus 1, the card reader 18 does not necessarily have to be provided. Accordingly, the card reader 18 seldom is a standard feature, and usually is an additional option. Thus, the configuration is such that the card reader 18 can be easily attached later.

The work of attachment may be performed by service staff, or by the user. In a case of attaching the optional card reader 18, the document feeder 10 is opened approximately 90 degrees by the hinge 22 that couples the document feeder 10 and the reader unit 12.

Figure 6A:
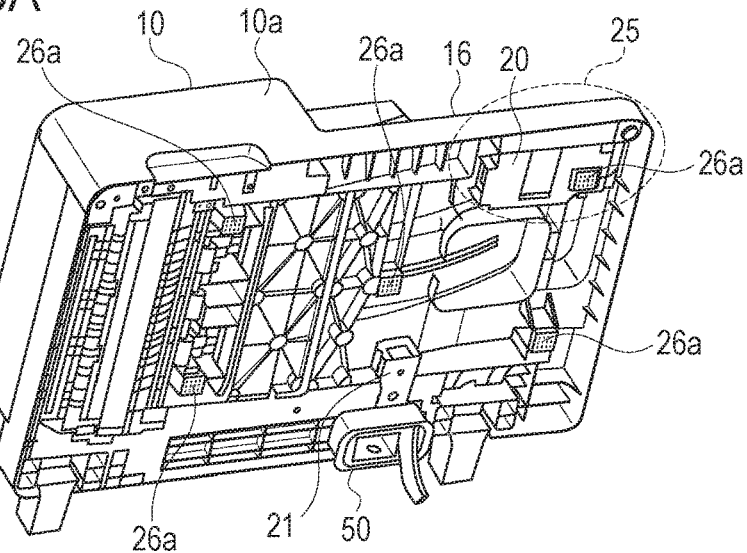
FIGS. 6A and 6B are diagrams regarding the document feeder, where
Figure 6B:
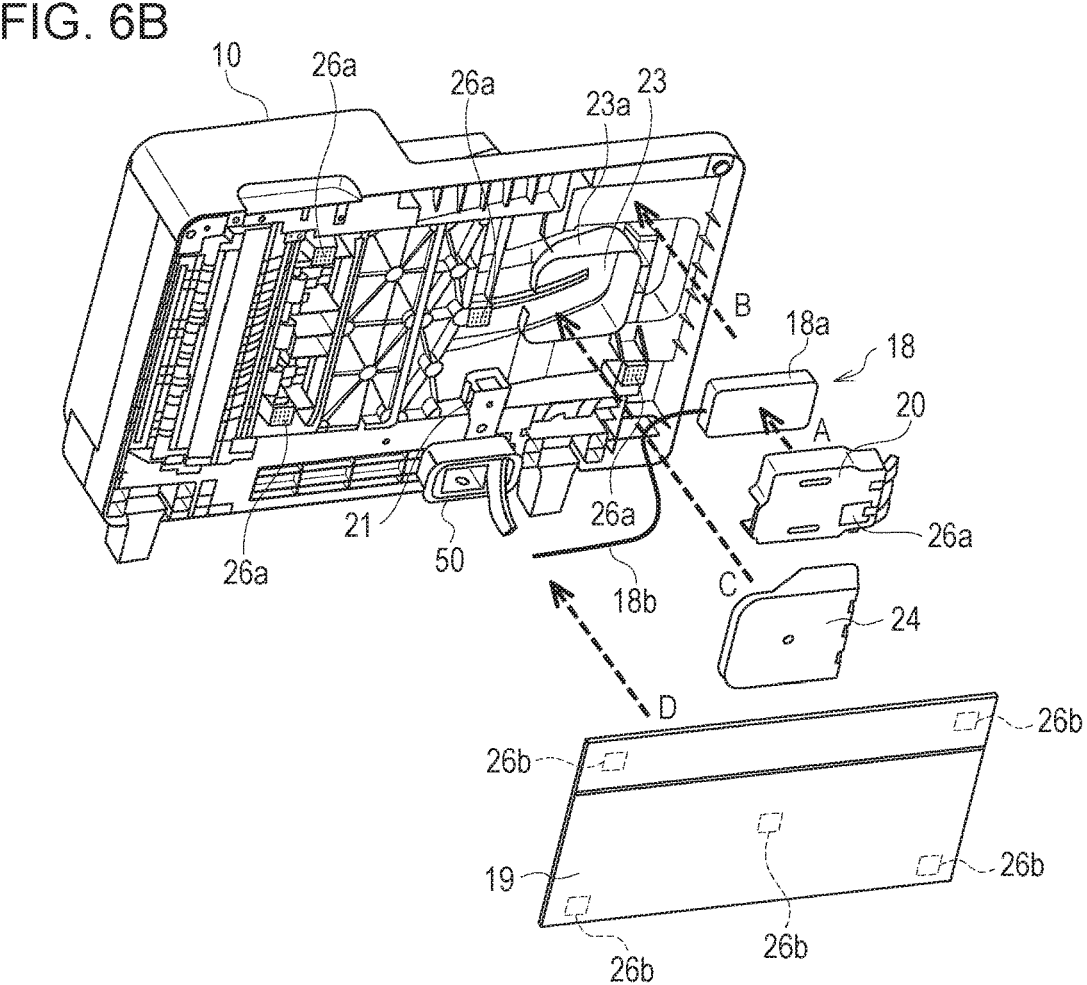

FIG. 6A is a perspective view of a state where the document pressing plate 19 of the document feeder 10 has been removed. FIG. 6B is an explanatory diagram where the card reader 18 has been attached to the document feeder main unit 10a.

The document pressing plate 19 is detachably attached to the document feeder main unit 10a by touch fasteners 26a and 26b serving as second attachment portions. Multiple touch fasteners 26a are disposed on the document feeder main unit 10a, and touch fasteners 26b are disposed on the document pressing plate 19 at positions corresponding to the touch fasteners 26a. Removing the document pressing plate 19 from the document feeder main unit 10a exposes the interior of the document discharge tray 16, as illustrated in FIG. 6A. An attachment part 25, a cable cover member 24, and the connecting unit 21 are disposed on the inside of the document discharge tray 16. The card reader 18 includes the card reader main unit 18a that is a card reading unit, and the USB cable 18b. A USB terminal of the USB cable 18b is connected to the connecting unit 21. A control cable (omitted from illustration) for electrically connecting the connecting unit 21 and the reader control unit 2a-2 is guided by the cable guide 50. The cable guide 50 also guides a control cable for communicating image information read by the reading unit 3b to the reader control unit 2a-2 as well. Although the image reading device control unit 2a is configured having the document feeder control unit 2a-1 and reader control unit 2a-2 in the present embodiment, this is not restrictive. An image reading device control unit 2a that controls the entirety of the image reading device 2 may be provided to the reader unit 12 alone.

The attachment part 25 is a portion where the card reader main unit 18a is attached. Screw holes to receive screws 29 (see FIG. 8A) are provided in the attachment part 25. The card reader main unit 18a is attached to the attachment part 25 via a main unit cover member 20 that is a supporting container in the present embodiment. The main unit cover member 20 and cable cover member 24 are detachably mounted within the document discharge tray 16.

The procedures of attachment will be described with reference to FIG. 6B.

The card reader main unit 18a is held by the main unit cover member 20 (A). The detailed configuration whereby the main unit cover member 20 holds the card reader main unit 18a will be described later.

The main unit cover member 20 is fixed within the document feeder 10 (B). Note that the term "within the document feeder 10" refers to the space between the document stacking face of the document discharge tray 16 and the document pressing plate 19.

A USB connector is provided to the end of the USB cable 18b, and the USB connector is connected to a connecting portion 21b. The USB cable 18b is stored in a storage portion 23, and the USB cable 18b is covered by the cable cover member 24 (C).

The document pressing plate 19 is attached to the document feeder main unit 10a (D).

Attaching the card reader 18 in this way enables the image reading device control unit 2a to communicate with the card reader 18.

Now, there are various types of card readers 18 depending on the manufacturer, and accordingly various lengths of the USB cable 18b exist, from around 40 cm to around 180 cm. The document feeder 10 is provided so as to be capable of opening/closing as to the reader unit 12. Accordingly, if the USB cable 18b is stored within the document feeder 10 without being appropriately bundled when attaching the card reader 18, the USB cable 18b may move within the document feeder 10 due to the opening/closing actions of the document feeder 10. Consequently, the USB cable 18b may strike members in the vicinity and generate abnormal sounds. Alternatively, the USB cable 18b may become crimped by members in the vicinity, such as the document pressing plate 19 for example, when attaching the card reader 18 as described above, which can result in wire breakage.

In the present embodiment, a storage portion 23 that is a storage unit for storing the excess USB cable 18b extending from the card reader 18 is provided within the document feeder 10. The storage portion 23 is formed as a rectangular rib 23a on the inner side of the document discharge tray 16. The USB cable 18b is stored in a region on the inner side of the rib 23a.

Figure 7A:
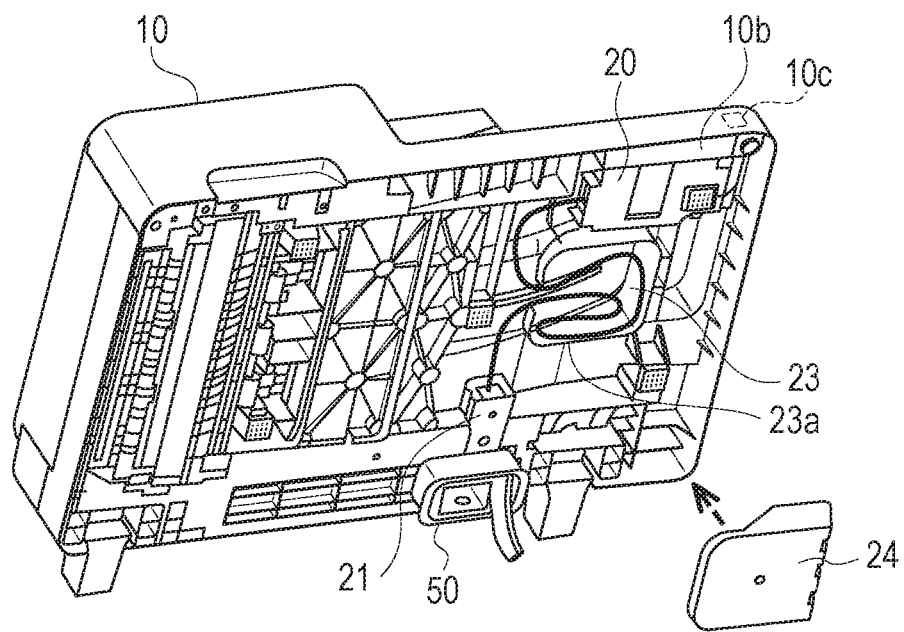
FIGS. 7A and 7B are diagrams regarding the document feeder, where
Figure 7B:
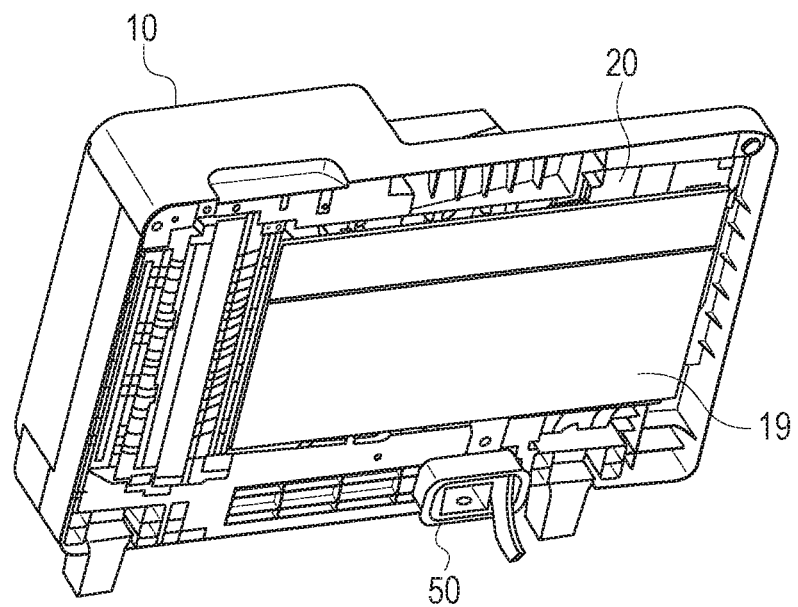

FIG. 7A is a perspective view of a state where the USB cable 18b is stored in the storage portion 23, and FIG. 7B is a perspective view of a state where the document pressing plate 19 of the document feeder 10 has been mounted. It can be seen from FIG. 7A that the USB cable 18b is stored in a bundled state in an interior space surrounded by the rib 23a. The USB cable 18b is covered by the cable cover member 24 so as to not protrude from the rib 23a. The document pressing plate 19 of the document feeder 10 is then mounted, as illustrated in FIG. 7B.

Figure 8A:
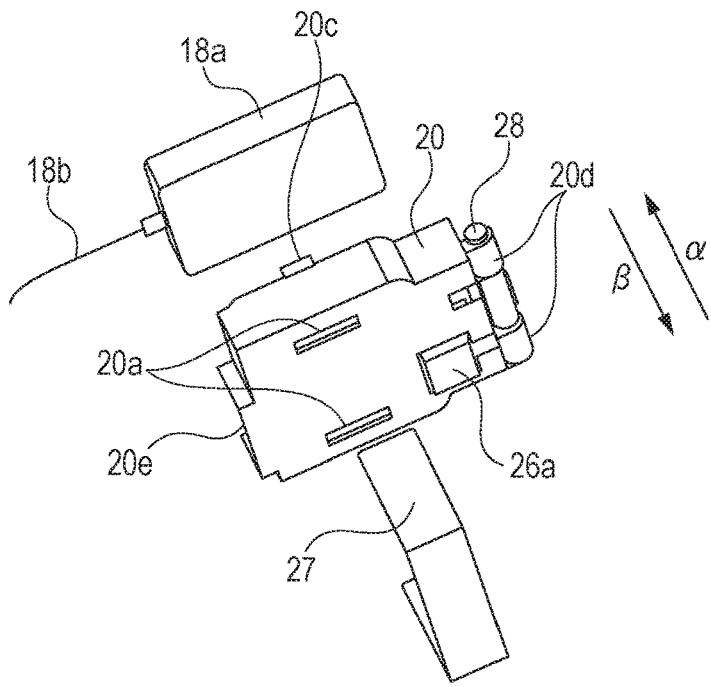
FIGS. 8A and 8B are enlarged configuration diagrams of a card reader main unit and main unit cover member, where
Figure 8B:
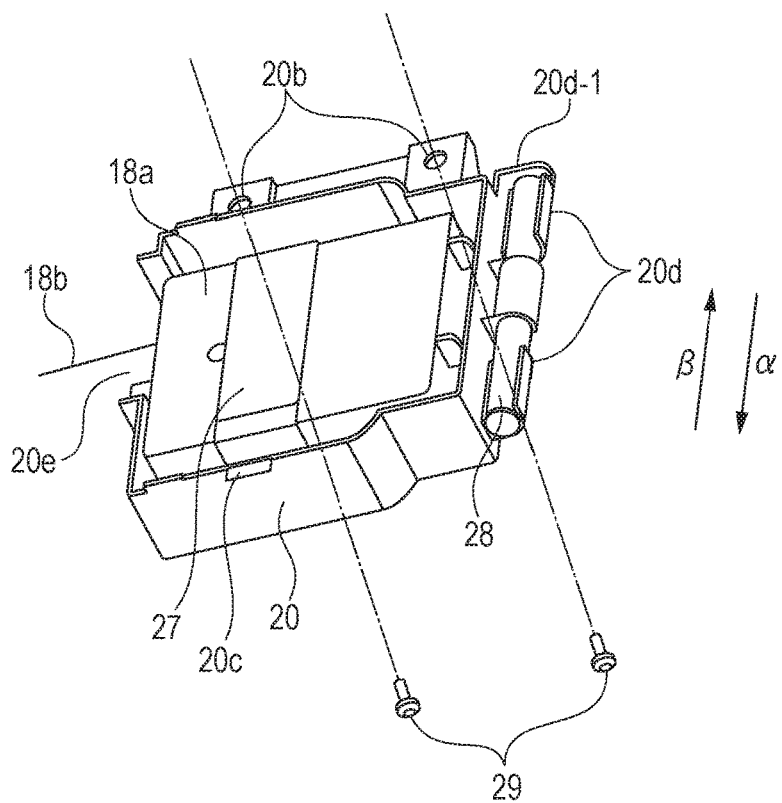

FIGS. 8A and 8B are enlarged configuration diagrams of the card reader main unit 18a and the main unit cover member 20. The main unit cover member 20 includes the touch fastener 26a, openings 20a, screw attachment portions 20b, a claw 20c, a weight mounting unit 20d, a securing portion 20d-1, and a cable opening 20e. The openings 20a are openings through which a belt 27 passes. The screw attachment portions 20b are openings through which screws 29 are passed. The screws 29 pass through the screw attachment portions 20b and are fixed in screw holes formed in the attachment part 25. The claw 20c engages the document feeder main unit 10a. The main unit cover member 20 is fixed to the document feeder main unit 10a by the screws 29 and claw 20c. A weight 28 is configured so as to be detachably mounted to the weight mounting unit 20d. The cable opening 20e extends the USB cable 18b to the outside of the main unit cover member 20. The securing portion 20d-1 will be described later. Providing the touch fastener 26a to the main unit cover member 20 enables the freedom of layout of the touch fastener 26b provided on the document pressing plate 19 to be improved.

Details of attaching the card reader main unit 18a will be described. The card reader main unit 18a is fixed to the main unit cover member 20 using the belt 27. The USB cable 18b is extended to the outside of the main unit cover member 20 from the cable opening 20e. The weight 28 is removed from the main unit cover member 20 by sliding in a direction α. The technical implication of the weight 28 will be described later. The claw 20c engages the document feeder main unit 10a. The card reader main unit 18a is fixed to the document feeder main unit 10a by the screws 29.

About the Storage Portion 23

According to the present embodiment, the excess portion of the USB cable 18b is stored in the storage portion 23. Accordingly, the excess potion of the USB cable 18b does not protrude from the storage portion 23 and impede movement of the document pressing plate 19. As a result, even if the user opens and closes the document feeder 10, the excess portion of the USB cable 18b is restrained to a certain extent, so a situation where the USB cable 18b strikes another member and generates abnormal sounds can be suppressed. Further, there is no concern of the USB cable 18b being pinched between the document discharge tray 16 or document feeder 10 and document pressing plate 19, or other like nearby parts, that might lead to wire breakage. Moreover, storing the excess portion of the USB cable 18b in the storage portion 23 facilitates attachment and removal work of the card reader 18 by service staff or the like. Although a configuration has been described where the storage portion 23 is covered by the cable cover member 24, the cable cover member 24 does not need to be provided as long as a configuration is made where the USB cable 18b is generally fixed, being stored in the storage portion 23.

About Card Reader 18 Attachment Configuration

According to the present embodiment, the document pressing plate 19 is configured to be detachable from the document feeder main unit 10a, and the attachment part 25 is externally exposed by the document pressing plate 19 having been removed. According to this configuration, access within the document feeder 10 is facilitated, and attachment/removal of the card reader 18 is easy. Also, according to the present embodiment, the document feeder main unit 10a has a ledge portion 10b protruding so as to cover part of the attachment part 25, as illustrated in FIG. 7A. Thus, the ledge portion 10b serves to suppress the card reader main unit 18a from falling out from the document feeder main unit 10a. In the present embodiment, the card reader main unit 18a is attached to the attachment part 25 in the document feeder main unit 10a, by first attachment portions including the main unit cover member 20 and belt 27. Accordingly, the card reader main unit 18a is attached to the main unit cover member 20 and then attached to the document feeder main unit 10a, so the attachment work is easier than with a configuration of directly attaching the card reader main unit 18a to the document feeder main unit 10a.

Although a configuration has been described in the present embodiment where the document pressing plate 19 is completely removable from the document feeder main unit 10a, this is not restrictive. An arrangement may be made where only part of the document pressing plate 19 is removed from the document feeder main unit 10a. Also, a configuration may be made where part of the document pressing plate 19 is coupled with the document feeder main unit 10a and another part of the document pressing plate 19 is removable from the document feeder main unit 10a, thereby externally exposing the attachment part 25.

About Weight 28

According to the present embodiment, the main unit cover member 20 has the weight mounting unit 20d, from this the weight 28 is removable. In a case where the card reader 18 is attached to the document feeder main unit 10a, the weight 28 is removed from the document feeder main unit 10a. In a case of removing the card reader 18 from the document feeder main unit 10a, the weight 28 is attached to the document feeder main unit 10a. Thus, the weight of the document feeder 10 can be kept from greatly changing depending on whether the card reader 18 is attached or not.

The reason for this will be described. The document placed on the reading glass 4 is pressed by the document pressing plate 19. However, if the weight of the document feeder 10 is insufficient, the document may not be appropriately pressed against the reading glass 4, and there may be portions of the document that are not in close contact with the reading glass 4. If there are portions of the document that are not in close contact with the reading glass 4, the reading of the document by the reading unit 3a will be defective. Accordingly, when the card reader 18 is removed from the document feeder main unit 10a, the weight 28 that has generally the same weight as the card reader 18 is attached, so that the weight of the document feeder 10 does not greatly change depending on whether the card reader 18 is attached or not. The term "generally the same weight as the card reader 18" means a weight around that of the card reader 18 optionally attached to the image reading device 2, ±20% or so.

The weight mounting portion 20d of the main unit cover member 20 has the securing portion 20d-1. To attach the weight 28 to the main unit cover member 20, the weight 28 is slid in the direction β. The weight 28 abuts the securing portion 20d-1 and is secured so as not to fall out any further. Once the main unit cover member 20 is attached to the document feeder main unit 10a, a wall 10c of the document feeder main unit 10a is situated at a position facing the weight 28, thereby preventing the weight 28 from falling out. According to this configuration, attaching of the weight 28 to the document feeder main unit 10a is facilitated when the main unit cover member 20 is removed from the document feeder main unit 10a. On the other hand, the weight 28 can be prevented from falling out from the main unit cover member 20 when the main unit cover member 20 is attached to the document feeder main unit 10a. Although the direction of attaching the weight 28 has been described as being the direction β in the present embodiment, this is not restrictive. The weight 28 may be attached from a direction perpendicular to the direction β. In this case as well, an arrangement may be made where a wall of the document feeder main unit 10a prevents the weight 28 from falling out when the main unit cover member 20 is attached to the document feeder main unit 10a.

Although a configuration where the weight mounting portion 20d is provided to the main unit cover member 20 has been described in the present embodiment, this is not restrictive. A configuration may be made where the main unit cover member 20 is not used, and the weight 28 is directly attached to the document feeder main unit 10a.

Relationship between Motor M and Card Reader Main Unit 18a

Figure 9:
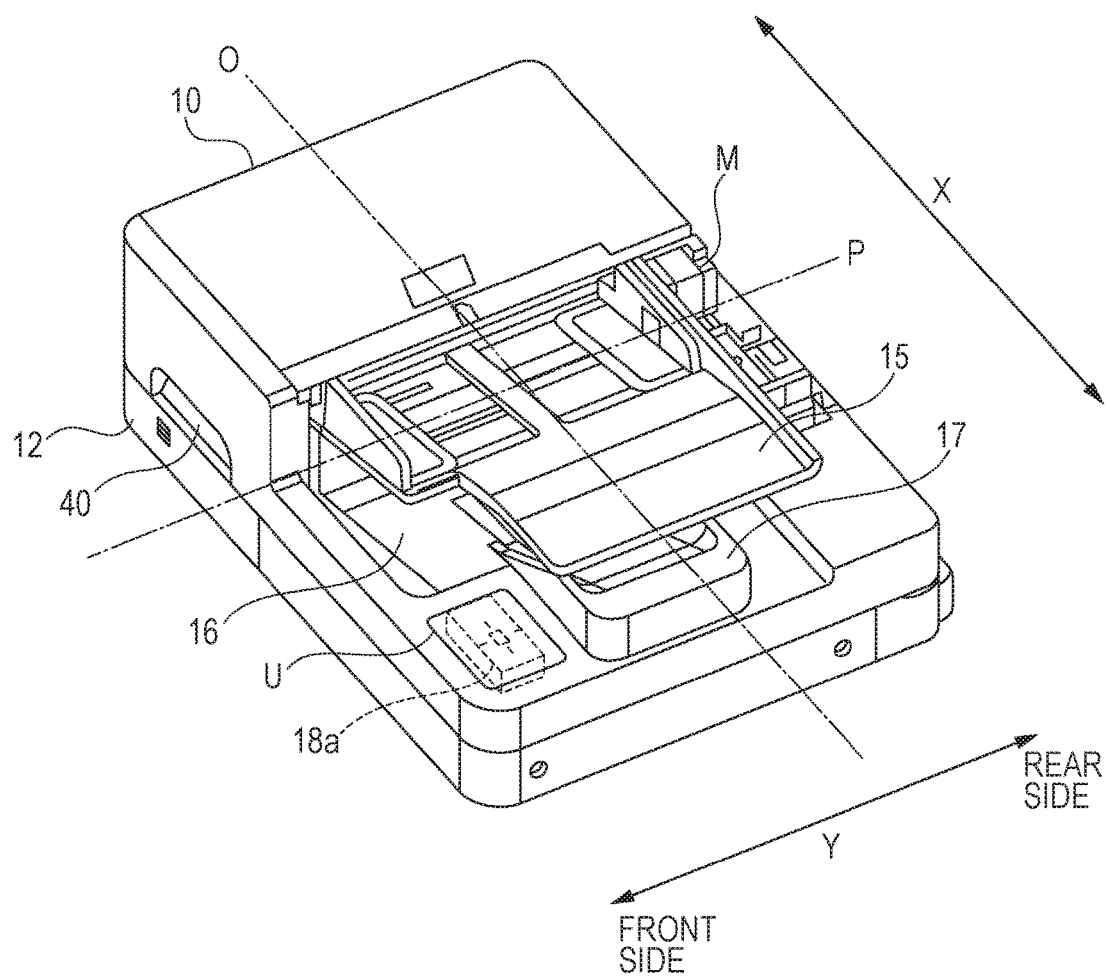
FIG. 9 is a diagram illustrating a state where part of outer casing of the document feeder has been removed and a motor exposed.
Figure 10:
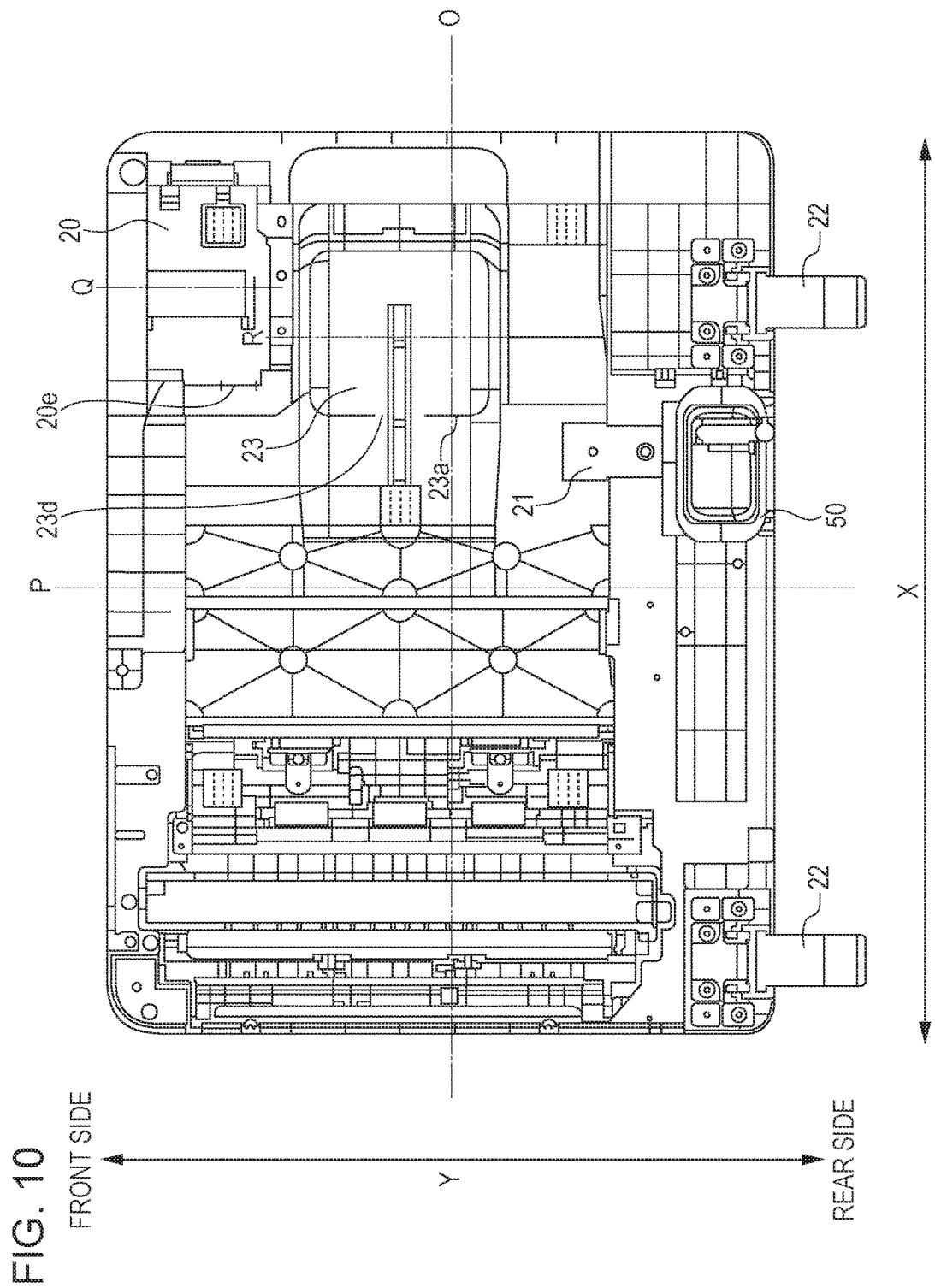
FIG. 10 is a plan view from below the document feeder, in a state where the document pressing plate is removed from the document feeder.

FIG. 9 is an explanatory diagram illustrating a state where part of outer casing of the document feeder 10 has been removed and the motor M exposed. FIG. 10 is a plan view from below the document feeder 10, in a state where the document pressing plate 19 has been removed from the document feeder 10.

In FIGS. 9 and 10, the rotary axis line direction of the hinge 22 is the X direction, and a direction orthogonal to the rotary axis line direction is the Y direction. An imaginary line passing through the center of the document feeder 10 in the X direction is denoted by O, and an imaginary line passing through the center of the document feeder 10 in the X direction is denoted by P.

In the present embodiment, the motor M is disposed on one side of the imaginary line O in the Y direction, and the attachment part 25 of the card reader main unit 18a is disposed on the other side of the imaginary line O. Also, the motor M is disposed on one side of the imaginary line P in the X direction, and the attachment part 25 of the card reader main unit 18a is disposed on the other side of the imaginary line P. Thus, the motor M and the card reader main unit 18a that have considerable weight are disposed on opposite sides across the center, thereby preventing the center of gravity of the document feeder 10 from greatly deviating from the center of the document feeder 10. The document feeder 10 presses the document against the reading glass 4 by the document pressing plate 19. If the center of gravity of the document feeder 10 greatly deviates from the center, the pressing state of the document may not be uniform, and reading of the image on the document may be defective. The motor M is disposed to the side close to the hinge (rear side) in the Y direction, and the attachment part 25 is disposed to the side far from the hinge (front side). This makes it difficult for the user to touch the electric system such as the motor M, and easier for the user to perform authentication operations by having the attachment part 25 at the front side.

The attachment part 25 of the card reader main unit 18a is situated on the same side of the imaginary line P as the operating panel 9 in the X direction. Having the operating panel 9 and the attachment part 25 close together in this way reduces the amount of movement of the line of sight of the user in a case where the user is instructed to perform card authentication operations at the operating panel 9.

A gripping portion 40 that the user grips to turn the document feeder 10 is disposed on the same side of the imaginary line P as the motor M in the X direction. Having the point of effort near the motor M in this way suppresses twisting of the document feeder 10 due to the weight of the motor M.

As illustrated in FIG. 10, the connecting unit 21 is disposed on the same side of the imaginary line O as the motor M in the Y direction. Situating the connecting unit 21 and the motor M close to each other in this way makes it easier to lay the cable connected to the image reading device control unit 2a for driving the motor M, and the cable connected from the connecting unit 21 to the image reading device control unit 2a.

About Connecting Unit 21

The position of the connecting unit 21 will be described with reference to FIG. 10. The connecting unit 21 and cable guide 50 are situated on the side of the imaginary line O closer to the hinge in the Y direction. The connecting unit 21 and cable guide 50 are also situated on the same side of the imaginary line P. The connecting unit 21 and cable guide 50 are thus situated close to each other. In order to maximally reduce the length of the cable between the document feeder 10 and the reader unit 12, the cable guide 50 provided between the document feeder 10 and reader unit 12 preferably is provided on the side closer to the hinge 22 in the Y direction. Providing the connecting unit 21 at a position near to the hinge 22 as well enables the cable connected from the connecting unit 21 to the reader unit 12 to be reduced. Note that providing the connecting unit 21 on the side near to the hinge 22 in the Y direction may result in the length of the USB cable 18b connected from the connecting unit 21 to the card reader main unit 18a to be longer in comparison with a case where the connecting unit 21 is provided on the side far from the hinge 22 in the Y direction (i.e., close to the main unit cover member 20). However, in light of the fact that the user may not necessarily connect the card reader 18 to the document feeder 10, it would be better to maximally reduce the length of the cable connecting the reader unit 12 and the connecting unit 21, thereby eliminating the trouble of routing this cable.

Also, the cable opening 20e of the main unit cover member 20 that stores the card reader main unit 18a is situated on the side of an imaginary line Q passing through the center of the main unit cover member 20 that is closer to the connecting unit 21 in the X direction. An opening portion 23d of the rib 23a of the storage portion 23 is also situated on the side of an imaginary line R passing through the center of the storage portion 23 that is closer to the connecting unit 21. Accordingly, that range of routing the USB cable 18b within the document feeder 10 is shorter.

Configuration of Document Discharge Tray 16

Figure 11:
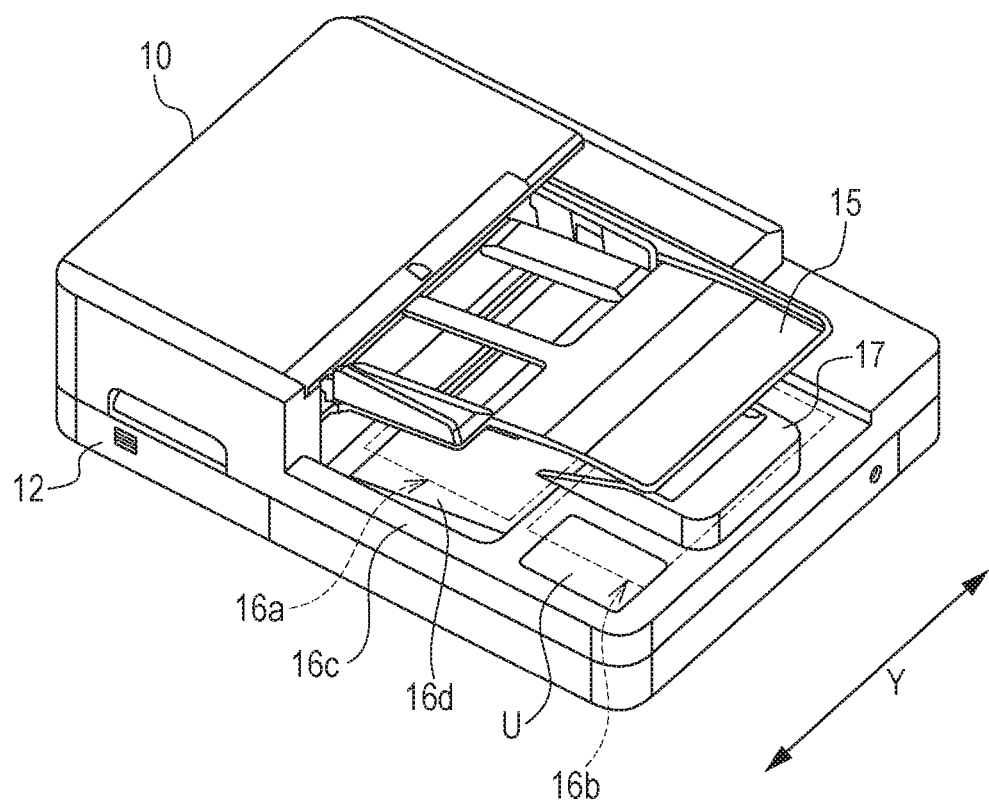
FIG. 11 is a diagram for describing the configuration of a document discharge tray.

FIG. 11 is a diagram for describing the configuration of the document discharge tray 16. The region of the document discharge tray 16 where documents are stacked can be classified into a first region 16a and a second region 16b. Note that the region where documents are stacked (the first region 16a and second region 16b) is defined by the maximum size that the image reading device 2 can read. The region where documents are stacked (the first region 16a and second region 16b) does not mean the portion where a document and the document discharge tray 16 come into contact, but the part of the document discharge tray 16 that is covered by a document.

The first region 16a is a region where a sheet regulating portion 16c is provided on the front side thereof in the Y direction. The sheet regulating portion 16c is a portion that is higher than a bottom face 16d with which documents come into contact. The sheet regulating portion 16c suppresses documents discharged by the discharge roller pair 36 from being displaced toward the front side. The second region 16b downstream is a region where no such sheet regulating portion 16c is provided. The second region 16b is provided on the downstream side of the first region 16a in the document discharging direction.

The bottom face 16d of the first region 16a is an inclined face that is higher the farther downstream in the document discharging direction (the same direction as the document conveyance direction). Accordingly, discharged documents are gathered by gravity at the upstream side in the document discharging direction, and are arrayed by the upstream edges thereof coming into contact with a contact wall 16e.

Returning to FIG. 11, The authentication unit U (the attachment part 25 where the card reader main unit 18a is provided) preferably is provided in the region where sheets are stacked. However, providing the authentication unit U in the first region 16a means providing the authentication unit U at the bottom face 16d or the sheet regulating portion 16c. Providing the authentication unit U on the bottom face 16d is troublesome for the user, since the user has to reach past the sheet regulating portion 16c for authentication. On the other hand, providing the authentication unit U at the sheet regulating portion 16c results in increasing the size of the apparatus, since enough space in the Y direction needs to be secured to install the card reader main unit 18a inside the sheet regulating portion 16c. Accordingly, the authentication unit U is installed at a position at least partly overlapping the second region 16b in the present embodiment, making authentication easier for the user. The surface of the authentication unit U is a horizontal plane in the present embodiment, which also makes authentication easier for the user. The upper face of the sheet regulating portion 16c and the face of the authentication unit U are generally flush, presenting the user with a visually simple design. The second region 16b is also provided with the inclined portion 17 that creates a gap between documents discharged onto the document discharge tray 16 and the authentication unit U, making authentication easier for the user.

Others

Although description has been made in the above embodiment regarding a device to which a card reader is attached, by way of an example of the document feeder 10, this is not restrictive. A configuration may be made where a storage portion to store a communication cable is provided within a pressing plate unit that does not have document conveying functions.

Although description has been made in the above embodiment regarding an electrophotographic image forming apparatus, this is not restrictive. The present embodiment may be applied to an ink-jet image forming apparatus that forms images on sheets by discharging ink, instead of an electrophotographic image forming apparatus.

Although description has been made in the above embodiment regarding a copier having an image forming apparatus main unit as an image reading device, this is not restrictive. The present embodiment may be applied to a standalone image reading device, such as a flatbed scanner.

Although description has been made in the above embodiment regarding an example of using a card reader as an authentication device that is a communication unit that wirelessly communicates with the user, this is not restrictive. The present embodiment may be applied to other authentication devices such as fingerprint authentication devices, biometric authentication devices (vein authentication), and so forth. Further, application may be made to communication devices that communicate data of images using Near Field Communication (NFC), other than authentication devices.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-200404 filed Oct. 11, 2016, which is hereby incorporated by reference herein in its entirety.

What is claimed is:

1. An image reading device comprising:
    a reading unit having a reading glass, and a reader configured to read an image on a document located on a surface of the reading glass; and
    a document feeding unit configured to turn with respect to the reading unit, wherein the document feeding unit includes:
    a conveyance unit configured to convey a document,
    a discharge unit configured to discharge the document conveyed by the conveyance unit,
    a discharge tray on which sheets of the document discharged by the discharge unit are to be stacked, and
    an attachment part to which a communication unit configured to acquire information about a user using the image reading device is attached,
    wherein the discharge tray includes a regulating portion disposed opposite a turning axis of the document feeding unit with respect to the center of the document feeding unit in a first direction perpendicular to the turning axis of the document feeding unit and parallel to the reading glass surface on which the document is to be placed and configured to regulate a movement of the document on the discharge tray in the first direction,
    wherein the attachment part is disposed downstream of the regulating portion in a second direction in which the document is discharged, and
    wherein, in the first direction, at least a portion of the attachment part overlaps a region where sheets of the document are to be stacked.

2. The image reading device according to claim 1, wherein the discharge tray includes an inclined face, wherein a level of the inclined face in a vertical direction at a first position in the second direction is lower than a level of the inclined face in the vertical direction at a second position in the second direction, and wherein the second postion is located downstream of the first position.

3. The image reading device according to claim 2, wherein the discharge tray includes a contact wall configured to come into contact with an upstream side edge of the document in the second direction.

4. The image reading device according to claim 1, wherein an upper face of the document feeding unit in a region where the attachment part is disposed is a horizontal plane.

5. The image reading device according to claim 1, wherein the regulating portion includes a first face that is an upper face of the discharge tray on which sheets of the document are to be stacked, a second face that intersects with the first face, and a third face that intersects with the second face and includes a level that is higher than a level of the first face in a vertical direction, and wherein the third face and an upper face of the document feeding unit in a region where the attachment part is disposed are flush.

6. The image reading device according to claim 1, wherein a level, in a vertical direction, of an upper face of the discharge tray at a position where the attachment part is disposed in the second direction is higher than a level, in the vertical direction, of an upper face of the document feeding unit in a region where the attachment part is disposed.

7. The image reading device according to claim 1, wherein the communication unit is a card reader configured to acquire information about a user using the image reading device.

8. The image reading device according to claim 1, wherein, in the first direction, at least the portion of the attachment part overlaps a region where the regulating portion is disposed.

9. The image reading device according to claim 1, wherein an upper face of the regulating portion and an upper face of the document feeding unit in a region where the attachment part is disposed are flush.

10. An image forming apparatus comprising:
an image reading unit having a reading glass, and a reader configured to read an image on a document located on a surface of the reading glass;
an image forming unit configured to form images based on a reading result of the image reading unit; and
a document feeding unit configured to turn with respect to the image reading unit,
wherein the document feeding unit includes:
a conveyance unit configured to convey a document,
a discharge unit configured to discharge the document conveyed by the conveyance unit,
a discharge tray on which sheets of the document discharged by the discharge unit are to be stacked, and
an attachment part to which a communication unit configured to acquire information about a user using the image forming apparatus is attached,
wherein the discharge tray includes a regulating portion disposed opposite a turning axis of the document feeding unit with respect to the center of the document feeding unit in a first direction perpendicular to the turning axis of the document feeding unit and parallel to the reading glass surface on which the document is to be placed and configured to regulate a movement of the document on the discharge tray in the first direction,
wherein the attachment part is disposed downstream of the regulating portion in a second direction in which the document is discharged, and
wherein, in the first direction, at least a portion of the attachment part overlaps a region where sheets of the document are to be stacked.

11. The image forming apparatus according to claim 10, wherein the discharge tray includes an inclined face,
wherein a level of the inclined face in a vertical direction at a first position in the second direction is lower than a level of the inclined face in the vertical direction at a second position in the second direction, and
wherein the second position is located downstream of the first position.

12. The image forming apparatus according to claim 11, wherein the discharge tray includes a contact wall configured to come into contact with an upstream side edge of the document in the second direction.

13. The image forming apparatus according to claim 10, wherein an upper face of the document feeding unit in a region where the attachment part is disposed is a horizontal plane.

14. The image forming apparatus according to claim 10,
wherein the regulating portion includes a first face that is an upper face of the discharge tray on which sheets of the document are to be stacked, a second face that intersects with the first face, and a third face that intersects with the second face and includes a level that is higher than a level of the first face in a vertical direction, and
wherein the third face and an upper face of the document feeding unit in a region where the attachment part is disposed are flush.

15. The image forming apparatus according to claim 10, wherein a level, in a vertical direction, of an upper face of the discharge tray at a position where the attachment part is disposed in the second direction is higher than a level, in the vertical direction, of an upper face of the document feeding unit in a region where the attachment part is disposed.

16. The image forming apparatus according to claim 10, wherein the communication unit is a card reader configured to acquire information about a user using the image forming apparatus.

17. The image forming apparatus according to claim 10, wherein, in the first direction, at least the portion of the attachment part overlaps a region where the regulating portion is disposed.

18. The image forming apparatus according to claim 10, wherein an upper face of the regulating portion and an upper face of the document feeding unit in a region where the attachment part is disposed are flush.

* * * * *